UNITED STATES PATENT OFFICE.

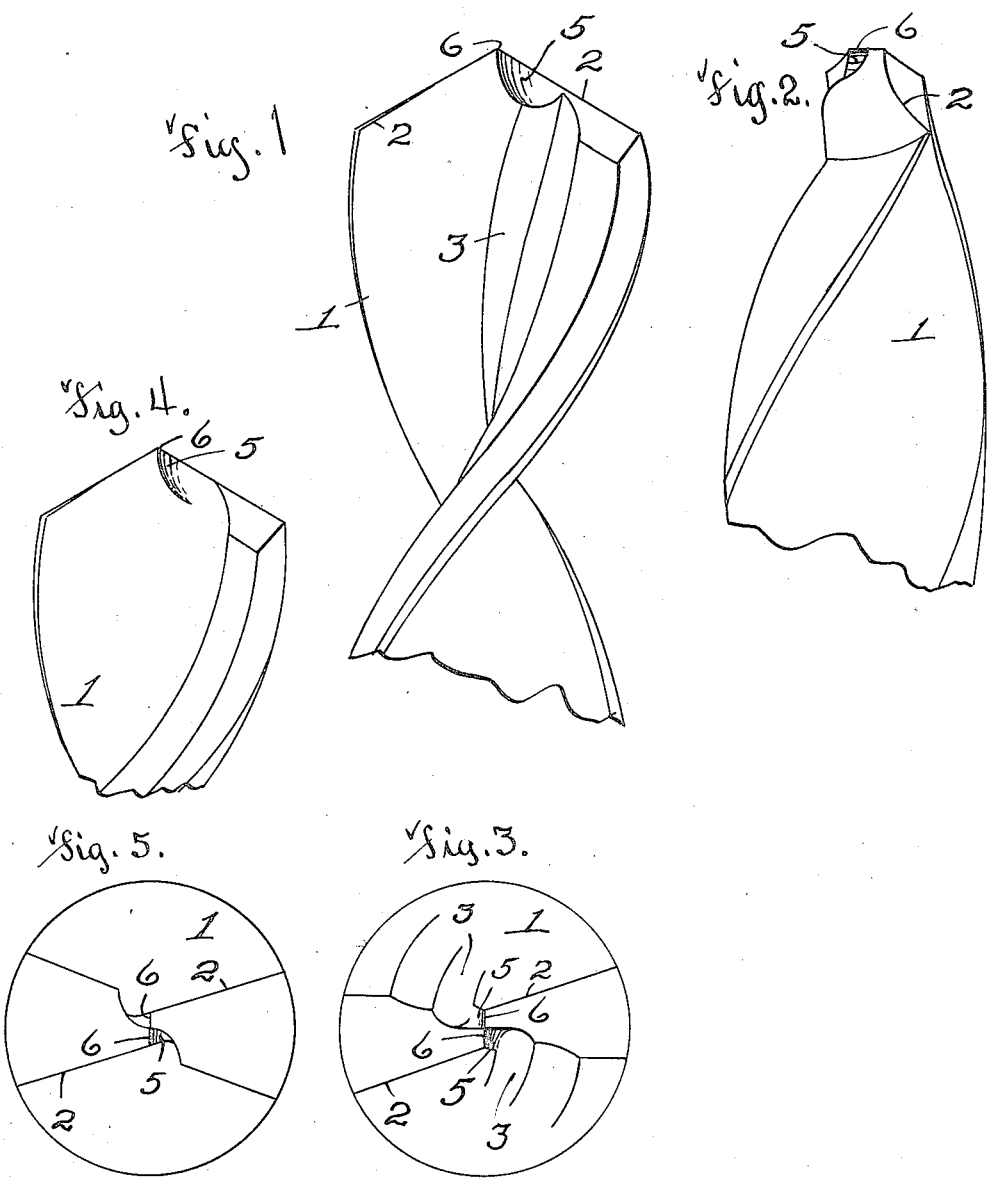

WILLIAM R. DOWN, OF READING, PENNSYLVANIA.

DRILL.

1,069,930.

Specification of Letters Patent. Patented Aug. 12, 1913.

Application filed April 23, 1912. Serial No. 692,677.

*To all whom it may concern:*

Be it known that I, WILLIAM R. DOWN, citizen of the United States, residing at Reading, in the county of Berks and State of Pennsylvania, have invented certain new and useful Improvements in Drills, of which the following is a specification.

This invention relates to improvements in drills of the class commonly termed twist drills, and my object in the present instance is to increase the efficiency of the cutting edge thereof. In drills of this character, the point of the drill, which is equal to the thickness of the web or center section is, in many cases, of such a width as to interfere materially with the drilling action, for the reason that this point does not act as a cutting lip, but acts merely to force the metal immediately beneath it out from the center and in line with the cutting lips. In drilling hard metals, the web must be of an appreciable thickness in order to stand this strain, and the thicker the web the wider the point, so that the actual cutting lips are subjected to additional strain and oftentimes this results in breaking the drill.

In my present invention, I have increased the cutting edges, by grinding out a cup like cavity on each side of the point for a distance about equal to one-half of the thickness of the web, so that the point first presents the two cutting edges to the center of the portion to be drilled and these cutting edges merge into the usual cutting lips, so that by this construction, the two point lips will relieve the larger cutting lips of any undue strain.

The invention is more fully described in the following specification and clearly illustrated in the accompanying drawing, in which:—

Figure 1, is an elevation, showing the flat side of the cutting end of a twist drill. Fig. 2 is an edge view thereof. Fig. 3 is a plan view of the cutting end of the drill. Figs. 4 and 5 show respectively an elevation and plan view of a slightly modified form of my invention.

The numeral 1 designates the body of the drill, which is of the ordinary twist drill form, and 2 designates the cutting lips thereof. In the flat wall of the body I form a groove 3 which preferably extends the full length of the drill. The grooves not only permit the easy and free flow of the cooling liquid to the drill point, but also permit the chips to rise along the drill length and prevent choking. In the cutting edge, where this groove starts, I cut out a cup like depression 5, to a depth approximately one half of the thickness of the web, at both sides, thus forming on the point of the drill, two small cutting edges 6, facing in opposite directions, and extending approximately the full width of the drill point when considered jointly, thus supplying a cutting edge the full distance across the center of the drill. It is evident that these two relatively small cutting edges on the drill point will, when the drill begins to turn, cut the metal instead of "pushing" it out from the center to be cut by the usual cutting lips or edges 2, as is the case with the ordinary drill. As the drill becomes dull these cup like depressions are ground out just as the cutting lips are ground or sharpened, and the groove 3 permits this to be done with ease.

In Figs. 4 and 5 I have shown a drill formed with the two additional cutting edges by grinding the depressions in the wall of the drill without first forming the groove therein; this will permit the drill to retain its full strength of web and will be useful in extreme cases where very great strength is required.

With my device, drilling may be done with greater ease, and rapidity and harder metal may be operated upon without undue strain on any portion of the drill.

The life of the drill is materially lengthened for the reason that it will not require so frequent sharpening.

Having thus described my invention, what I claim and desire to secure by Letters Patent is:—

1. A twist drill having a body of continuous and symmetrical cross-section formed with a pair of cutting lips and a pair of grooves, the cutting edges of which lips are made up of two cutting edges arranged at an angle to each other and extending from the periphery of the drill to the longitudinal center, beyond which point the edges merge into the grooves.

2. A twist drill of symmetrical cross-section, formed with a pair of cutting lips, each comprising two cutting edges, arranged at an angle to each other and extending from the periphery of the drill to the diametrical center thereof, there being a pair of grooves in the body of the drill, each of which terminates in one of the cutting edges near the drill point.

In testimony whereof I affix my signature in presence of two witnesses.

WILLIAM R. DOWN.

Witnesses:
 Ed. A. Kelly,
 Clara E. Young.